United States Patent
Gudkov et al.

(10) Patent No.: US 12,062,144 B2
(45) Date of Patent: Aug. 13, 2024

(54) AUTOMATED AUGMENTED REALITY EXPERIENCE CREATION BASED ON SAMPLE SOURCE AND TARGET IMAGES

(71) Applicant: Snap Inc., Santa Monica, CA (US)

(72) Inventors: Konstantin Gudkov, Playa Vista, CA (US); Andrey Alejandrovich Gomez Zharkov, Santa Monica, CA (US); Vadim Velicodnii, London (GB); Aleksei Zhuravlev, London (GB); Sergey Demyanov, Brooklyn, NY (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/804,500

(22) Filed: May 27, 2022

(65) Prior Publication Data
US 2023/0386144 A1  Nov. 30, 2023

(51) Int. Cl.
| | |
|---|---|
| *G06N 20/00* | (2019.01) |
| *G06F 3/01* | (2006.01) |
| *G06F 3/04815* | (2022.01) |
| *G06F 8/34* | (2018.01) |
| *G06N 3/045* | (2023.01) |

(Continued)

(52) U.S. Cl.
CPC ............ *G06T 19/006* (2013.01); *G06F 3/011* (2013.01); *G06F 3/04815* (2013.01); *G06F 8/34* (2013.01); *G06N 3/045* (2023.01); *G06N 3/08* (2013.01); *G06N 20/00* (2019.01); *G06T 3/10* (2024.01)

(58) Field of Classification Search
None
See application file for complete search history.

(56) References Cited

U.S. PATENT DOCUMENTS

| 5,604,843 A | 2/1997 | Shaw et al. |
| 5,689,559 A | 11/1997 | Park |

(Continued)

FOREIGN PATENT DOCUMENTS

| CN | 109863532 A | 6/2019 |
| CN | 110168478 A | 8/2019 |

(Continued)

OTHER PUBLICATIONS

"International Application Serial No. PCT/US2023/023240, International Search Report dated Sep. 29, 2023", 4 pgs.

(Continued)

*Primary Examiner* — Joni Hsu
(74) *Attorney, Agent, or Firm* — Schwegman Lundberg & Woessner, P.A.

(57) ABSTRACT

Methods and systems are disclosed for performing automatically creating AR experiences on a messaging platform. The methods and systems perform operations that include: receiving, via a graphical user interface (GUI), input that specifies a plurality of image transformation parameters; accessing a set of sample source images; modifying the set of sample source images based on the plurality of image transformation parameters to generate a set of sample target images; training a machine learning model to generate a given target image from a given source image by establishing a relationship between the set of sample source images and the set of sample target images; and automatically generating an augmented reality experience comprising the trained machine learning model.

20 Claims, 10 Drawing Sheets

(51) Int. Cl.
  *G06N 3/08* (2023.01)
  *G06T 3/00* (2006.01)
  *G06T 3/10* (2024.01)
  *G06T 19/00* (2011.01)

(56) References Cited

U.S. PATENT DOCUMENTS

| | | |
|---|---|---|
| 5,880,731 A | 3/1999 | Liles et al. |
| 6,023,270 A | 2/2000 | Brush, II et al. |
| RE36,919 E | 10/2000 | Park |
| RE37,052 E | 2/2001 | Park |
| 6,223,165 B1 | 4/2001 | Lauffer |
| 6,650,793 B1 | 11/2003 | Lund et al. |
| 6,772,195 B1 | 8/2004 | Hatlelid et al. |
| 6,804,417 B1 | 10/2004 | Lund et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| RE43,993 E | 2/2013 | Park |
| 8,384,719 B2 | 2/2013 | Reville et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| RE44,121 E | 4/2013 | Park |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,532,364 B2 | 12/2016 | Fujito |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,938,758 B2 | 3/2021 | Allen et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,036,781 B1 | 6/2021 | Baril et al. |
| 11,063,891 B2 | 7/2021 | Voss |
| 11,069,103 B1 | 7/2021 | Blackstock et al. |
| 11,080,917 B2 | 8/2021 | Monroy-HernÁNdez et al. |
| 11,128,586 B2 | 9/2021 | Al Majid et al. |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-HernÁNdez et al. |
| 11,284,144 B2 | 3/2022 | Kotsopoulos et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |

(56) References Cited

U.S. PATENT DOCUMENTS

| | | |
|---|---|---|
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0198711 A1* | 8/2007 | Maring ............... G06F 16/9577 709/225 |
| 2008/0007625 A1* | 1/2008 | Reid .................... G06T 11/00 707/E17.026 |
| 2008/0158222 A1 | 7/2008 | Li et al. |
| 2008/0263258 A1* | 10/2008 | Allwell ............... G06F 9/45558 711/6 |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0082558 A1* | 3/2014 | Lynch .................. G06F 3/0481 715/764 |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |
| 2016/0234149 A1 | 8/2016 | Tsuda et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Dusen et al. |
| 2017/0310934 A1 | 10/2017 | Du et al. |
| 2017/0312634 A1 | 11/2017 | Ledoux et al. |
| 2018/0047200 A1 | 2/2018 | O'Hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0057616 A1 | 2/2019 | Cohen et al. |
| 2019/0097958 A1 | 3/2019 | Collet et al. |
| 2019/0108621 A1 | 4/2019 | Condorovici |
| 2019/0188920 A1 | 6/2019 | Mcphee et al. |
| 2019/0236363 A1* | 8/2019 | Bacelis ................. G06V 20/52 |
| 2019/0280997 A1 | 9/2019 | Baldwin et al. |
| 2019/0303669 A1* | 10/2019 | Spooner ............... G06N 3/08 |
| 2019/0335186 A1* | 10/2019 | Huang ................. H04N 19/176 |
| 2020/0013143 A1* | 1/2020 | Wilson ................. G06T 3/4038 |
| 2020/0082607 A1* | 3/2020 | Degtyarev ............ G06T 15/50 |
| 2020/0242774 A1 | 7/2020 | Park et al. |
| 2020/0293828 A1 | 9/2020 | Wang et al. |
| 2020/0306637 A1 | 10/2020 | Baldwin et al. |
| 2020/0320769 A1* | 10/2020 | Chen .................... G06F 18/214 |
| 2020/0372127 A1 | 11/2020 | Denton et al. |
| 2020/0410575 A1 | 12/2020 | Grantham et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0360179 A1 | 11/2021 | Dangi et al. |
| 2021/0385180 A1 | 12/2021 | Al Majid et al. |
| 2021/0390781 A1 | 12/2021 | Charlton et al. |
| 2021/0405831 A1 | 12/2021 | Mourkogiannis et al. |
| 2021/0409535 A1 | 12/2021 | Mourkogiannis et al. |
| 2022/0012929 A1 | 1/2022 | Blackstock et al. |
| 2022/0076374 A1* | 3/2022 | Li ......................... G06N 20/00 |
| 2023/0081171 A1* | 3/2023 | Zhang ................... G06V 10/82 382/157 |
| 2023/0153522 A1* | 5/2023 | Cho ..................... G06V 10/82 382/159 |
| 2023/0386144 A1 | 11/2023 | Gudkov et al. |

FOREIGN PATENT DOCUMENTS

| | | |
|---|---|---|
| EP | 2184092 A2 | 5/2010 |
| JP | 2001230801 A | 8/2001 |
| JP | 5497931 B2 | 3/2014 |
| KR | 101445263 B1 | 9/2014 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | 2023230064 | 11/2023 |

OTHER PUBLICATIONS

"International Application Serial No. PCT/US2023/023240, Written Opinion dated Sep. 29, 2023", 7 pgs.

Buslaev, Alexander, et al., "Albumentations: Fast and Flexible Image Augmentations", Information, vol. 11, No. 2, (Feb. 24, 2020).

"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.

"Bitmoji Chrome Extension", [Online] Retrieved from the Internet: <URL: https://web.archive.org/web/20200919024925/https://support.bimoji.com/hc/en-US/articles/360001494066>, (Sep. 19, 2020), 5 pgs.

"Bitmoji Customize text", [Online] Retrieved from the Internet: <URL: https://web.archive.org/web/20210225200456/https://support.bitmoji.com/hc/en-US/articles/360034632291-Customize-Text-on-Bitmoji-Stickers>, (captured Feb. 25, 2021), 3 pgs.

"Bitmoji Family", Snapchat Support, [Online] Retrieved from the Internet: <URL: https://web.archive.org/web/20190503063620/

(56) References Cited

OTHER PUBLICATIONS https://support.snapchat.com/en-US/article/bitmoji-family>, (captured May 3, 2019), 4 pgs.

"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.

"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.

"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.

Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.

Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.

MacMillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million- 1458876017>, (Mar. 25, 2016), 5 pgs.

Newton, Casey, "Your Snapchat friendships now have their own profiles-and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.

Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.

Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

\* cited by examiner

AUTOMATED AUGMENTED REALITY EXPERIENCE CREATION BASED ON SAMPLE SOURCE AND TARGET IMAGES

TECHNICAL FIELD

The present disclosure relates generally to generating augmented reality (AR) experiences on messaging applications.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
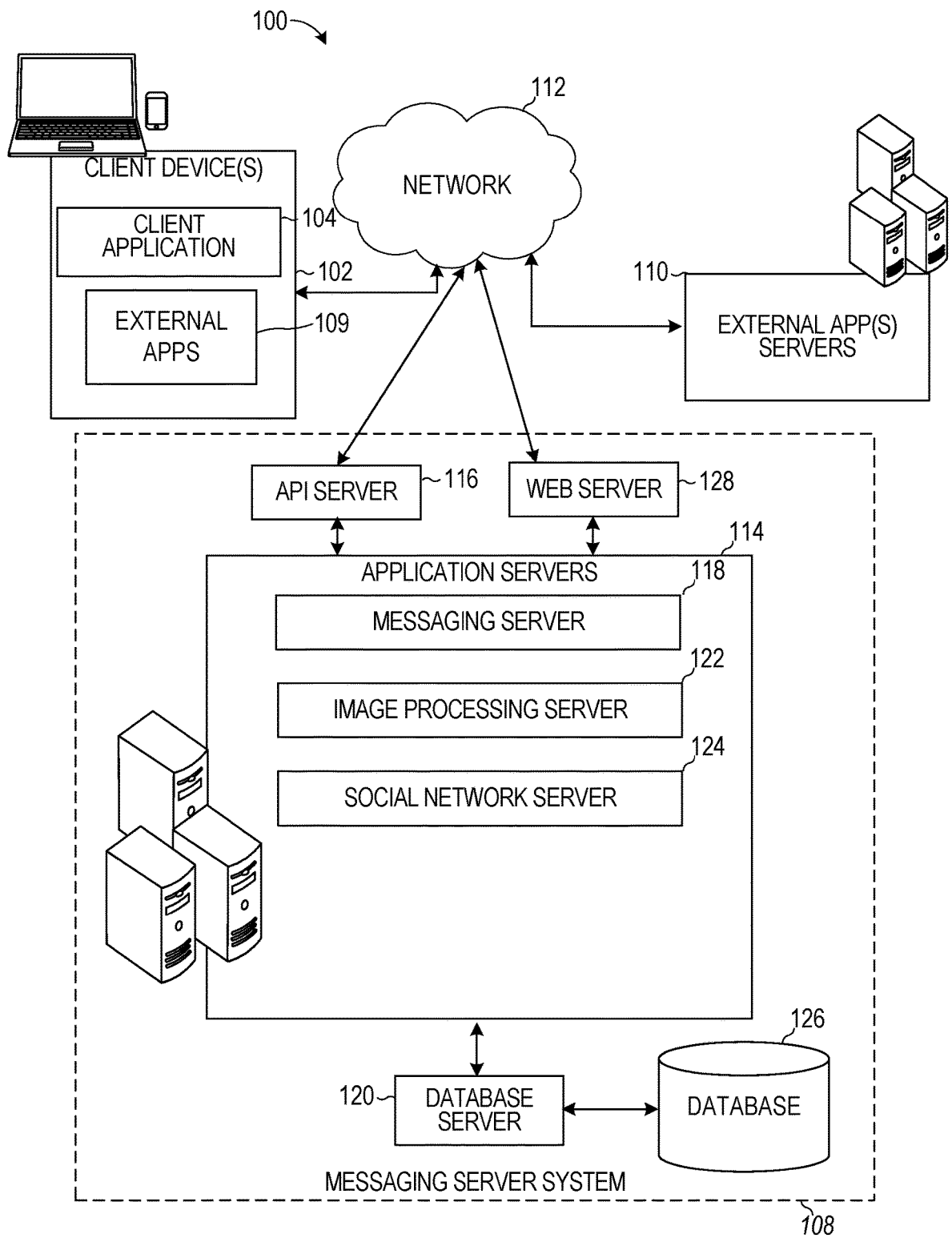
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Messaging applications typically enable end users to access various AR experiences by launching an AR experience bundle or package that includes the AR content associated with the AR experiences. The AR experiences typically present AR elements that are animated or that are anchored to particular positions. This allows the users to move around in the real-world and have the AR elements remain in place or move around in a similar manner. In order to create such AR experiences, AR developers dedicate a great deal of time and resources programming the behavior of the AR experiences. Particularly, AR developers are usually experienced computer programmers that can program certain machine learning models and can program different aspects of an AR system to generate a particular result or modification. As a result, less experienced users do not have ample opportunities to define and create engaging AR experiences. Also, the AR development platform remains used mainly by experienced AR developers, which leaves out a large audience of users who desire to create AR experiences but who may not have the experience to do so. This results in missed opportunities to engage with a wider audience of users.

In some cases, inexperienced users may access the AR development platform and can attempt to create AR experiences. However, because of their lack of experience, the resulting AR experience can take a very long time to create with many iterations and can even still end up having bugs. Such AR experiences may never be published for access by a wider population of users, which wastes system storage and processing resources used to create these wasted AR experiences.

The disclosed techniques solve these technical issues by providing an AR experience development and creation system that automatically generates an AR experience bundle based on a set of image transformation parameters. Specifically, the disclosed techniques receive, via a graphical user interface (GUI), input that specifies a plurality of image transformation parameters. The disclosed techniques access a set of sample source images. The disclosed techniques modify the set of sample source images based on the plurality of image transformation parameters to generate a set of sample target images. The disclosed techniques train a machine learning model to generate a given target image from a given source image by establishing a relationship between the set of sample source images and the set of sample target images. The disclosed techniques automatically generate an augmented reality experience that includes the trained machine learning model. In some examples, the augmented reality experience is published to a wide audience of users of a messaging application platform.

This allows novice users to create useful and engaging AR experience with minimal training and experience. Also, because the AR experiences are automatically generated using a machine learning model, the AR experiences are usually bug free and operate efficiently. This results in a conserved and reduced amount of system resources that are consumed for generating and providing AR experiences. In this way, the techniques described herein improve the efficiency of using the electronic device and the overall experience of the user in using the electronic device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a client application 104 and other external applications 109 (e.g., third-party applications). Each client application 104 is communicatively coupled to other instances of the client application 104 (e.g., hosted on respective other client devices 102), a messaging server system 108 and external app(s) servers 110 via a network 112 (e.g., the Internet). A client application 104 can also communicate with locally-hosted third-party applications, such as external apps 109, using Application Programming Interfaces (APIs). The client application 104 can include a messaging client, messaging application, and/or an AR developer application or an AR development client.

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

In some examples, the client device 102 can be operated by an AR experience developer. In such cases, the AR experience developer (or AR developer) accesses an AR experience development platform. The AR experience development platform allows the AR developer to automatically generate an AR experience bundle that includes a set of AR elements and events or triggers of different types by inputting one or more image transformation parameters. Specifically, the AR experience development platform performs operations that include receiving, via a GUI, input that specifies a plurality of image transformation parameters and accessing a set of sample source images. The set of sample source images can be generated by a neural network and represent one or more states of the neural network. The AR experience development platform modifies the set of sample source images based on the plurality of image transformation parameters to generate a set of sample target images and trains a machine learning model to generate a given target image from a given source image by establishing a relationship between the set of sample source images and the set of sample target images. In some cases, the set of sample source images are modified by editing or changing parameters of the neural network that generated the set of sample source images. The AR experience development platform automatically generates an AR experience (or AR experience bundle) that includes the trained machine learning model. In some examples, the augmented reality experience is published to a wide audience of users of a messaging application platform.

In some examples, the image transformation parameters include any one or a combination of a textual transformation description, image representations of transformations, one or more three-dimensional (3D) models, one or more machine learning models, a domain, skin tone preservation data, or cropping information. The textual transformation description indicates one or more of motion or object style in natural language text. The image representations of transformations include one or more images or a collection of images that represent the desired transformation or modification to be applied. The domain describes an object type that is a target of the image transformation parameters, such as a particular type of animal, body part, face, or other real-world object. The domain can inform the AR experience development platform about a type of object classifier to include in the automatically created AR experience bundle. The cropping information indicates whether to apply a wide crop or a narrow crop.

In some examples, the automatically created AR experience bundle is published and shared with a plurality of users of the messaging application. An indicator is presented on respective messaging applications of the automatically created AR experience bundle. In response to receiving selection of the indicator, the automatically created AR experience bundle is launched and used to modify one or more real-time or stored images or videos. For example, when the AR experience is launched or accessed on an end user client device 102, the AR elements of the AR experience are overlaid on top of a real-time image captured by the client device 102. The AR elements are modified or behave in a manner corresponding to the events or triggers associated with the AR experience bundle.

A client application 104 is able to communicate and exchange data with other client applications 104 and with the messaging server system 108 via the network 112. The data exchanged between client applications 104, and between a client application 104 and the messaging server system 108, includes functions (e.g., commands to invoke functions) as well as payload data (e.g., text, audio, video or other multimedia data).

The messaging server system 108 provides server-side functionality via the network 112 to a particular client application 104. While certain functions of the messaging system 100 are described herein as being performed by either a client application 104 or by the messaging server system 108, the location of certain functionality either within the client application 104 or the messaging server system 108 may be a design choice. For example, it may be technically preferable to initially deploy certain technology and functionality within the messaging server system 108 but to later migrate this technology and functionality to the client application 104 where a client device 102 has sufficient processing capacity.

The messaging server system 108 supports various services and operations that are provided to the client application 104. Such operations include transmitting data to, receiving data from, and processing data generated by the client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the client application 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the client application 104 in order to invoke functionality of the application servers 114. The API server 116 exposes various functions supported by the application servers 114, including account registration, login functionality, the sending of messages, via the application servers 114, from a particular client application 104 to another client application 104, the sending of media files (e.g., images or video) from a client application 104 to a messaging server 118, and for possible access by another client application 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the client application 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available to the client application 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
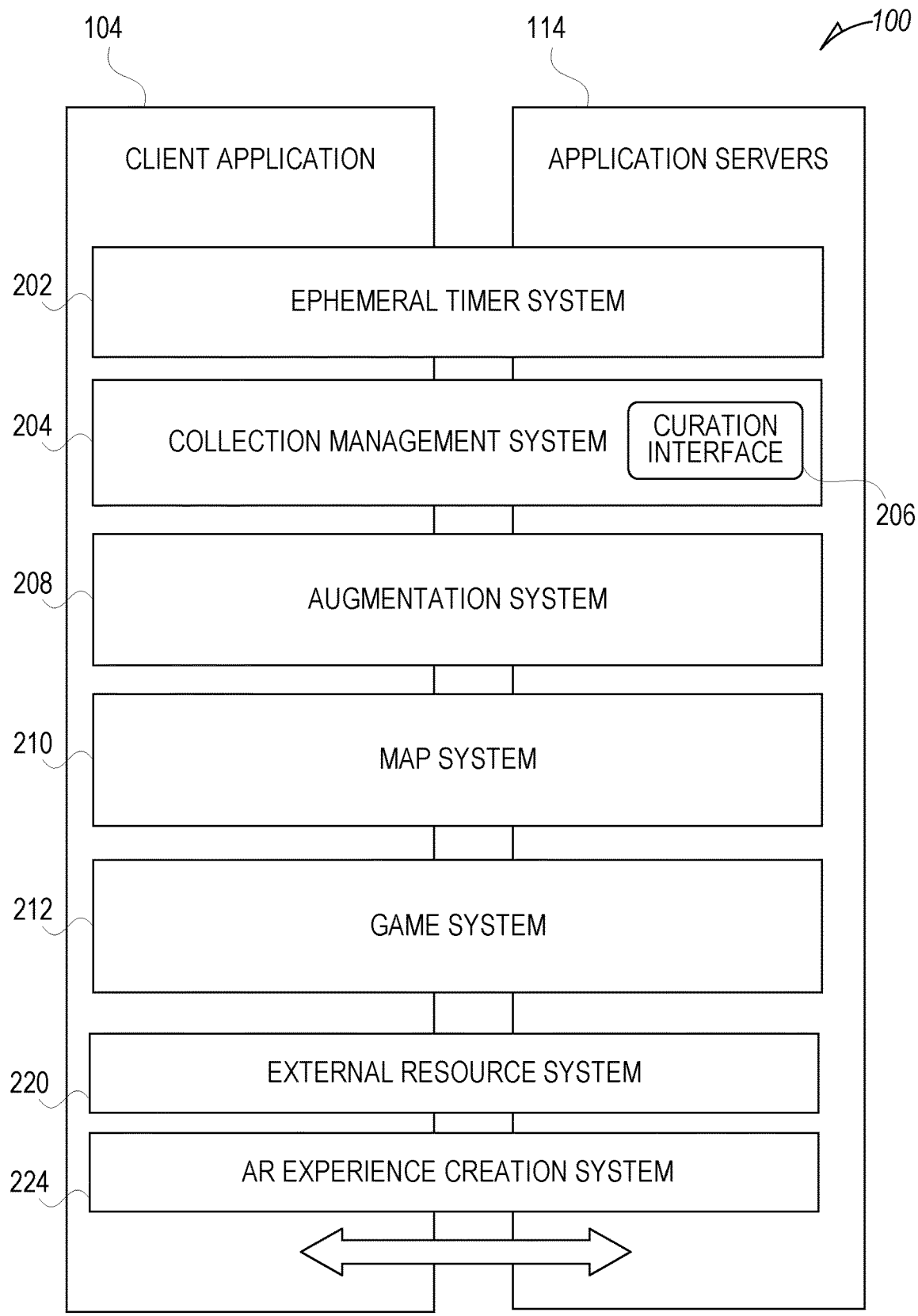
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the client application 104 on the client device 102 can be used to activate a camera. The camera displays one or more real-time images or a video to a user along with one or more icons or identifiers of one or more augmented reality experiences. The user can select a given one of the identifiers to launch the corresponding augmented reality experience or perform a desired image modification (e.g., replacing a garment being worn by a user in a video or recoloring the garment worn by the user in the video or modifying the garment based on a gesture performed by the user).

Figure 3:
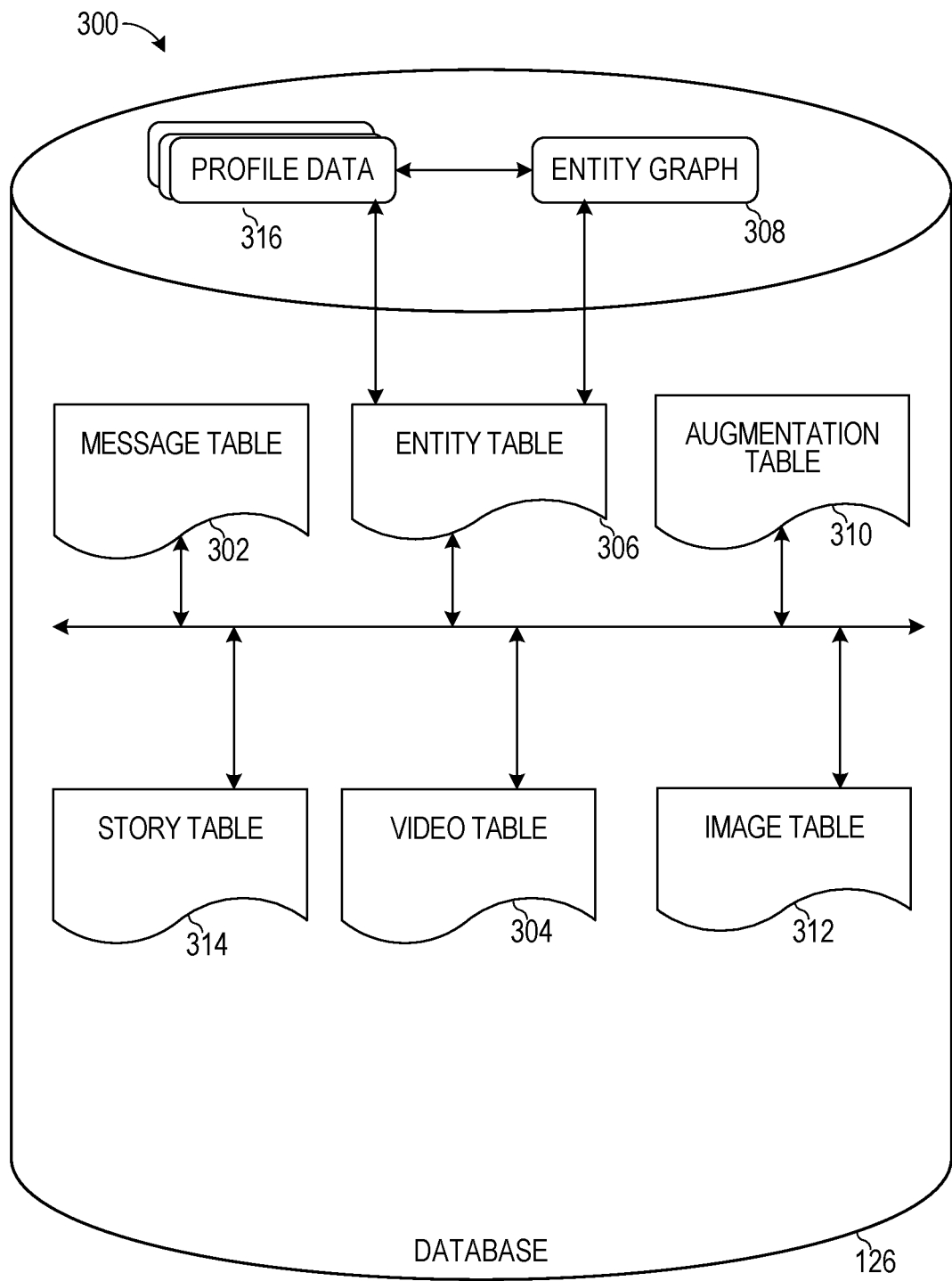
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the client application 104, features and functions of an external resource (e.g., a third-party application 109 or applet) are made available to a user via an interface of the client application 104. The client application 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the client application 104. In addition to using markup-language documents (e.g., a. *ml file), an applet may incorporate a scripting language (e.g., a. *js file or a .json file) and a style sheet (e.g., a .*ss file).

In response to receiving a user selection of the option to launch or access features of the external resource (external app 109), the client application 104 determines whether the selected external resource is a web-based external resource or a locally-installed external application. In some cases, external applications 109 that are locally installed on the client device 102 can be launched independently of and separately from the client application 104, such as by selecting an icon, corresponding to the external application 109, on a home screen of the client device 102. Small-scale versions of such external applications can be launched or accessed via the client application 104 and, in some examples, no or limited portions of the small-scale external application can be accessed outside of the client application 104. The small-scale external application can be launched by the client application 104 receiving, from an external app(s) server 110, a markup-language document associated with the small-scale external application and processing such a document.

In response to determining that the external resource is a locally-installed external application 109, the client application 104 instructs the client device 102 to launch the external application 109 by executing locally-stored code corresponding to the external application 109. In response to determining that the external resource is a web-based resource, the client application 104 communicates with the external app(s) servers 110 to obtain a markup-language document corresponding to the selected resource. The client application 104 then processes the obtained markup-language document to present the web-based external resource within a user interface of the client application 104.

The client application 104 can notify a user of the client device 102, or other users related to such a user (e.g., "friends"), of activity taking place in one or more external resources. For example, the client application 104 can provide participants in a conversation (e.g., a chat session) in the client application 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective client application 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the client application 104. The external resource can selectively include different media items in the responses, based on a current context of the external resource.

The client application 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The client application 104 can allow users to launch AR experiences with AR elements or events of different types, such as by accessing and executing an AR experience bundle. Specifically, the client application 104 can receive a request to access an AR experience. In response to receiving the request to access the AR experience, the client application 104 launches an AR experience bundle associated with the AR experience. As part of the AR experience bundle, the client application 104 accesses a list of event types associated with the AR experience. The client application 104 can present a real-time video or real-time images and can overlay one or more AR elements associated with the AR experience bundle on the real-time video or images in accordance with the event types.

In some examples, the client application 104 can present an AR developer interface. In such cases, the client application 104 can be operated by an AR developer to automatically develop and create one or more AR experiences, as discussed below.

System Architecture

FIG. 2 is a block diagram illustrating further details regarding the messaging system 100, according to some examples. Specifically, the messaging system 100 is shown to comprise the client application 104 and the application servers 114. The messaging system 100 embodies a number of subsystems, which are supported on the client side by the client application 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the client application 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the client application 104 based on a geolocation of the client device 102. In another example, the augmentation system 208 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House).

In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the client application 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the client application 104. A user can furthermore share his or her location and status information (e.g., using an appropriate status avatar) with other users of the messaging system 100 via the client application 104, with this location and status information being similarly displayed within the context of a map interface of the client application 104 to selected users.

The game system 212 provides various gaming functions within the context of the client application 104. The client application 104 provides a game interface providing a list of available games (e.g., web-based games or web-based applications) that can be launched by a user within the context of the client application 104, and played with other users of the messaging system 100. The messaging system 100 further enables a particular user to invite other users to participate in the play of a specific game, by issuing invitations to such other users from the client application 104. The client application 104 also supports both voice and text messaging (e.g., chats) within the context of gameplay, provides a leaderboard for the games, and also supports the provision of in-game rewards (e.g., coins and items).

The external resource system 220 provides an interface for the client application 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the client application 104). The client application 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the client application 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the client application 104 into the web-based resource.

The SDK stored on the messaging server 118 effectively provides the bridge between an external resource (e.g., third-party or external applications 109 or applets and the client application 104). This provides the user with a seamless experience of communicating with other users on the client application 104, while also preserving the look and feel of the client application 104. To bridge communications between an external resource and a client application 104, in certain examples, the SDK facilitates communication between external resource servers 110 and the client application 104. In certain examples, a Web ViewJavaScript-Bridge running on a client device 102 establishes two one-way communication channels between an external resource and the client application 104. Messages are sent between the external resource and the client application 104 via these communication channels asynchronously. Each SDK function invocation is sent as a message and callback. Each SDK function is implemented by constructing a unique callback identifier and sending a message with that callback identifier.

By using the SDK, not all information from the client application 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the client application 104. Once the user selects the visual representation or instructs the client application 104 through a GUI of the client application 104 to access features of the web-based external resource, the client application 104 obtains the HTML5 file and instantiates the resources necessary to access the features of the web-based external resource.

The client application 104 presents a graphical user interface (e.g., a landing page or title screen) for an external resource. During, before, or after presenting the landing page or title screen, the client application 104 determines whether the launched external resource has been previously authorized to access user data of the client application 104. In response to determining that the launched external resource has been previously authorized to access user data of the client application 104, the client application 104 presents another graphical user interface of the external resource that includes functions and features of the external resource. In response to determining that the launched external resource has not been previously authorized to access user data of the client application 104, after a threshold period of time (e.g., 3 seconds) of displaying the landing page or title screen of the external resource, the client application 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the client application 104 adds the external resource to a list of authorized external resources and allows the external resource to access user data from the client application 104. In some examples, the external resource is authorized by the client application 104 to access the user data in accordance with an OAuth 2 framework.

The client application 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The AR experience creation system 224 can receive, via a GUI, input that specifies a plurality of image transformation parameters. The AR experience creation system 224 accesses a set of sample source images. The AR experience creation system 224 modifies the set of sample source images based on the plurality of image transformation parameters to generate a set of sample target images. The AR experience creation system 224 trains a machine learning model to generate a given target image from a given source image by establishing a relationship between the set of sample source images and the set of sample target images. The AR experience creation system 224 automatically generates an augmented reality experience that includes the trained machine learning model. In some examples, the augmented reality experience is published to a wide audience of users of a messaging application platform.

In some examples, the AR experience creation system 224 displays, via the GUI, the set of sample source images and the set of sample target images. The AR experience creation system 224 receives input, via the GUI, that indicates that the set of sample target images is unacceptable. In response, the AR experience creation system 224 updates the set of image transformation parameters, such as by receiving further input from a user via the GUI. The AR experience creation system 224 generates an updated set of sample target images based on the updated set of image transformation parameters and updates the display of the GUI to present the updated set of sample target images. The AR experience creation system 224 receives input, via the GUI, that indicates that the updated set of sample target images is acceptable. This causes the AR experience creation system 224 to train the machine learning model in response to receiving the input that indicates that the updated set of sample target images is acceptable.

In some examples, the AR experience creation system 224 displays a plurality of cropping options on the GUI, each of the plurality of cropping options corresponding to a different network trained on different types of crops. The AR experience creation system 224 receives input, via the GUI, that selects a given cropping option from the plurality of cropping options. In response, the AR experience creation system 224 stores or updates the settings of the AR experience bundle that was automatically created based on the given cropping option to cause a cropping operation corresponding to the given cropping option to be performed when the automatically created AR experience bundle is launched on a client device 102.

In some examples, the AR experience creation system 224 receives, as one of the plurality of image transformation parameters, textual transformation description that describes a source representation and that describes a target representation. The AR experience creation system 224 processes the textual transformation description by a first model (e.g., a machine learning model, such as an artificial neural network or neural network) to generate a first translation of the source representation to the target representation. The AR experience creation system 224 uses the first model to obtain hidden representations of images associated with the first translation and generate a first set of image transformations. The AR experience creation system 224 applies the first set of image transformations to the set of sample source images via a first image modification pipeline to generate the set of sample target images.

In some examples, the AR experience creation system 224, simultaneously with the first image modification pipeline or sequentially before or after the first image modification pipeline, applies image transformations using a second image modification pipeline. Specifically, the AR experience creation system 224 receives, as a second one of the plurality of image transformation parameters, one or more image representations of transformations that visually represent the target representation. The AR experience creation system 224 processes the one or more image representations by a second model (e.g., a machine learning model) to generate a second translation of the target representation. The AR experience creation system 224 applies the second translation of the target representation to the set of sample source images via the second image modification pipeline to generate the set of sample target images.

In some examples, the AR experience creation system 224 generates, based on the set of sample source images, a first collection of images using the first image modification pipeline. The AR experience creation system 224 generates, based on the set of sample source images, a second collection of images using the second image modification pipeline. The AR experience creation system 224 estimates a combination (e.g., an average representation or weighted sum) of the first and second collections of images. The combination of the first and second collections of images is then used to generate the set of sample target images.

In some examples, the AR experience creation system 224 generates, based on the set of sample source images, a first collection of images using the first image modification pipeline and generates, based on the first collection of images, a second collection of images using the second image modification pipeline. In such cases, the set of sample target images is generated based on the second collection of images.

In some examples, the AR experience creation system 224 determines that the one or more image representations, received from the user via the GUI, includes a threshold quantity of images (e.g., 25 or more). In such cases, the AR experience creation system 224 trains a generative network (e.g., a generative machine learning model) based on the one or more image representations to generate additional image representations. The generative network can then be used to generate the set of sample target images.

In some examples, the AR experience creation system 224 receives, as a second one of the plurality of image transformation parameters, one or more machine learning models comprising a classifier or a translation model. The AR experience creation system 224 processes the set of sample source images by the one or more machine learning models (e.g., a guided generation model) independently of the first image modification pipeline to generate the set of sample target images. The one or more machine learning models can implement a neural network that generates images based on input parameters. In some examples, the AR experience creation system 224 receives, as a second one of the plurality of image transformation parameters, one or more three-dimensional (3D) models. The AR experience creation system 224 processes the set of sample source images using the one or more 3D models prior to providing features used to generate the set of sample target images. In some examples, the AR experience creation system 224 processes the set of sample source images using the one or more 3D models after generating the set of sample target images.

This functionality provides a greater amount of flexibility for a developer to create useful, interesting, and engaging AR experiences without having specific experience coding such AR experiences or spending a great deal of time and resources generating the AR experiences.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by client applications 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events, users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
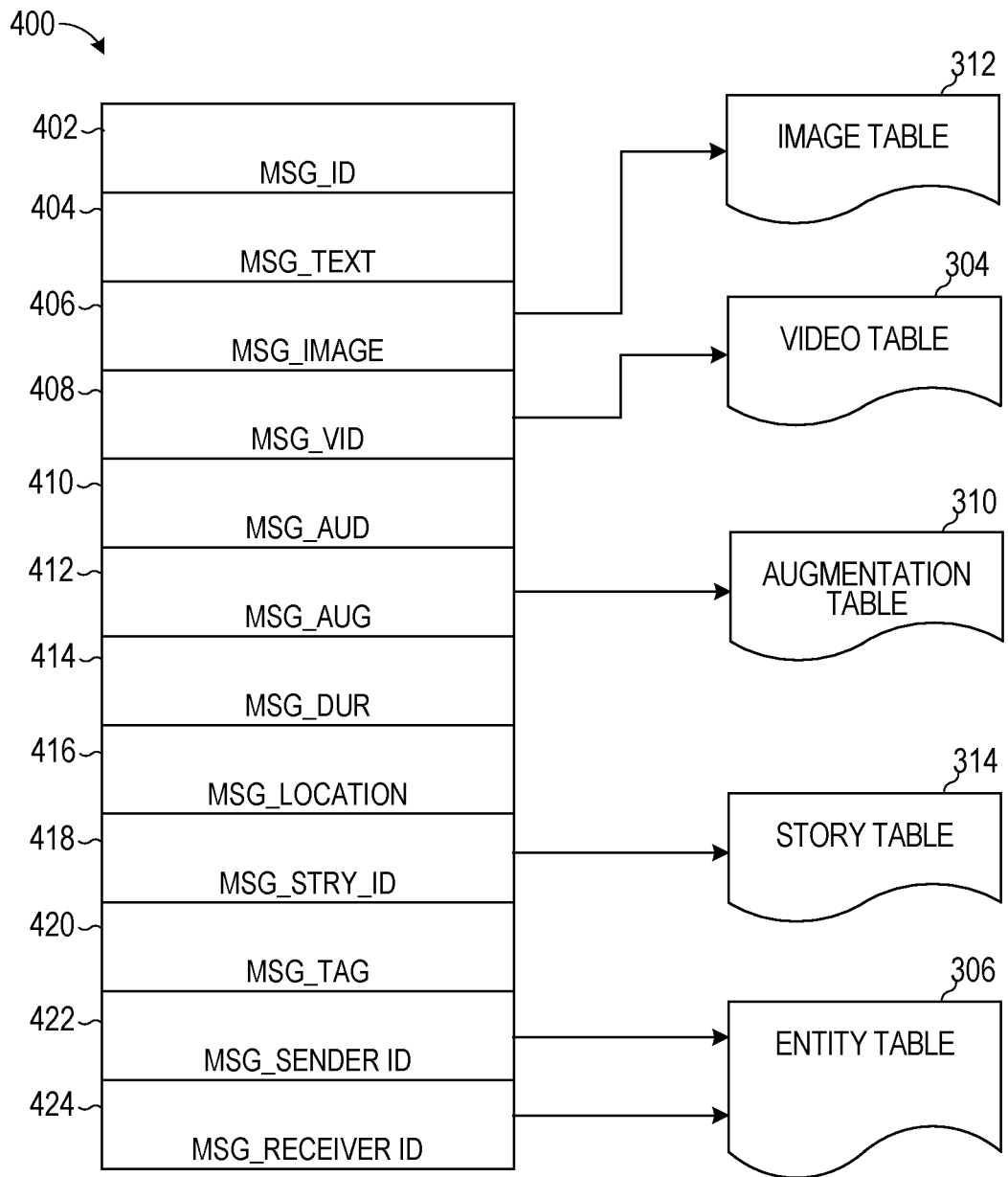
FIG. 4 is a diagrammatic representation of a message, in accordance with some examples.

FIG. 4 is a schematic diagram illustrating a structure of a message 400, according to some examples, generated by a client application 104 for communication to a further client application 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the client application 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

AR Experience Creation System

Figure 5:
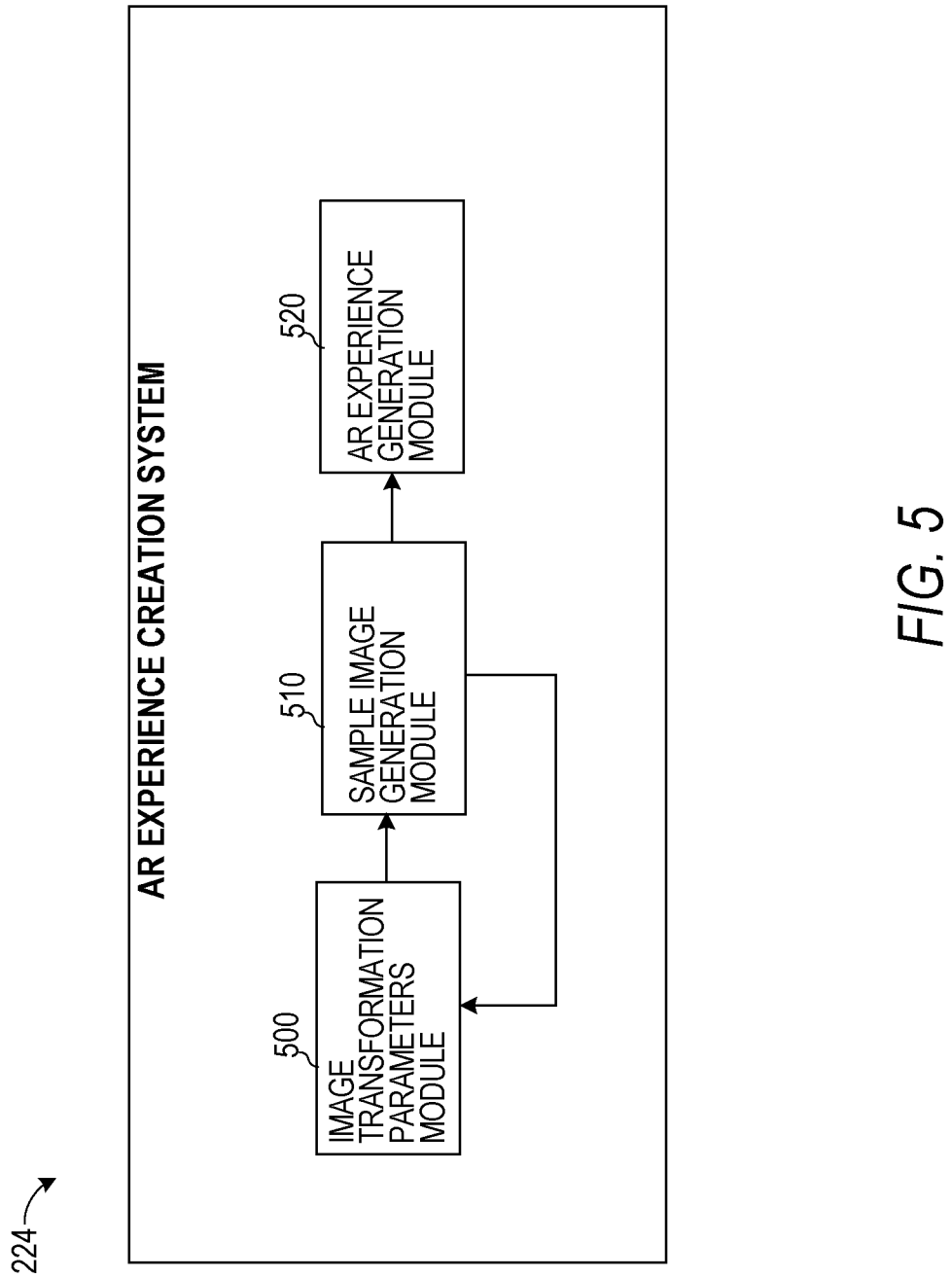
FIG. 5 is a block diagram showing an example AR experience creation system, according to some examples.

FIG. 5 is a block diagram showing an example AR experience creation system 224, according to some examples. The AR experience creation system 224 includes an image transformation parameters module 500, a sample image generation module 510, and an AR experience generation module 520.

The AR experience creation system 224 can generate user interfaces for presentation to an AR developer on an AR developer client device 102. The user interfaces can enable the AR developer to select one or more image transformation parameters which can be used to automatically generate one or more AR experience bundles. This way, the AR developer does not need to manually define and program code for generating certain AR experiences. The user interfaces enable AR developers to provide examples, in the way of text and/or images and/or ML models or 3D models which are then automatically processed to generate image transformations. If the image transformations are acceptable to the AR developer, a machine learning model (ML) is trained and included as part of an AR experience bundle to provide real-time image modifications that simulate the same resulting transformations.

Specifically, the AR experience creation system 224 can present a set of sample images, such as a random or pseudo-random source image without a transformation and a corresponding target image that represents the transformation applied to the source image. The AR experience creation system 224 can receive input that confirms or approves the transformation applied to the source image. In such cases, the AR experience creation system 224 accesses a plurality of source images and generates a corresponding plurality of target images. Once a suitable size training set is generated, the AR experience creation system 224 trains an ML model to establish a relationship between the source images and the target images. Based on the established relationship, the ML model can then receive a new source image and predict or generate a new target image that depicts the transformation applied to the new source image. The trained ML model is then bundled into and included as part of an AR experience bundle and is provided to the AR experience developer. The AR experience developer can then share the AR experience bundle with one or more other users of a messaging application platform.

As referred to herein, an "AR experience bundle" or "AR bundle" represents a set of AR elements (including standard AR elements and linked AR elements) and corresponding code that indicates the visual appearance, interaction, and behavior of each of the AR elements. The AR bundle includes the code necessary for a client device 102 to launch and execute the AR experience associated with the AR bundle.

In some examples, the image transformation parameters module 500 receives a request from a developer client device 102 to access a developer user interface. The image transformation parameters module 500 can receive login credentials from the developer client device 102. The image transformation parameters module 500 can search for an account associated with the login credentials and can generate a GUI associated with the account for presentation to the developer client device 102. The image transformation parameters module 500 can present, in the GUI, a plurality of AR experience bundles associated with the account. In some cases, the account is accessible to an organization, in which case multiple users within the organization can share access to the account and can view the same set of AR experience bundles.

Figure 6:
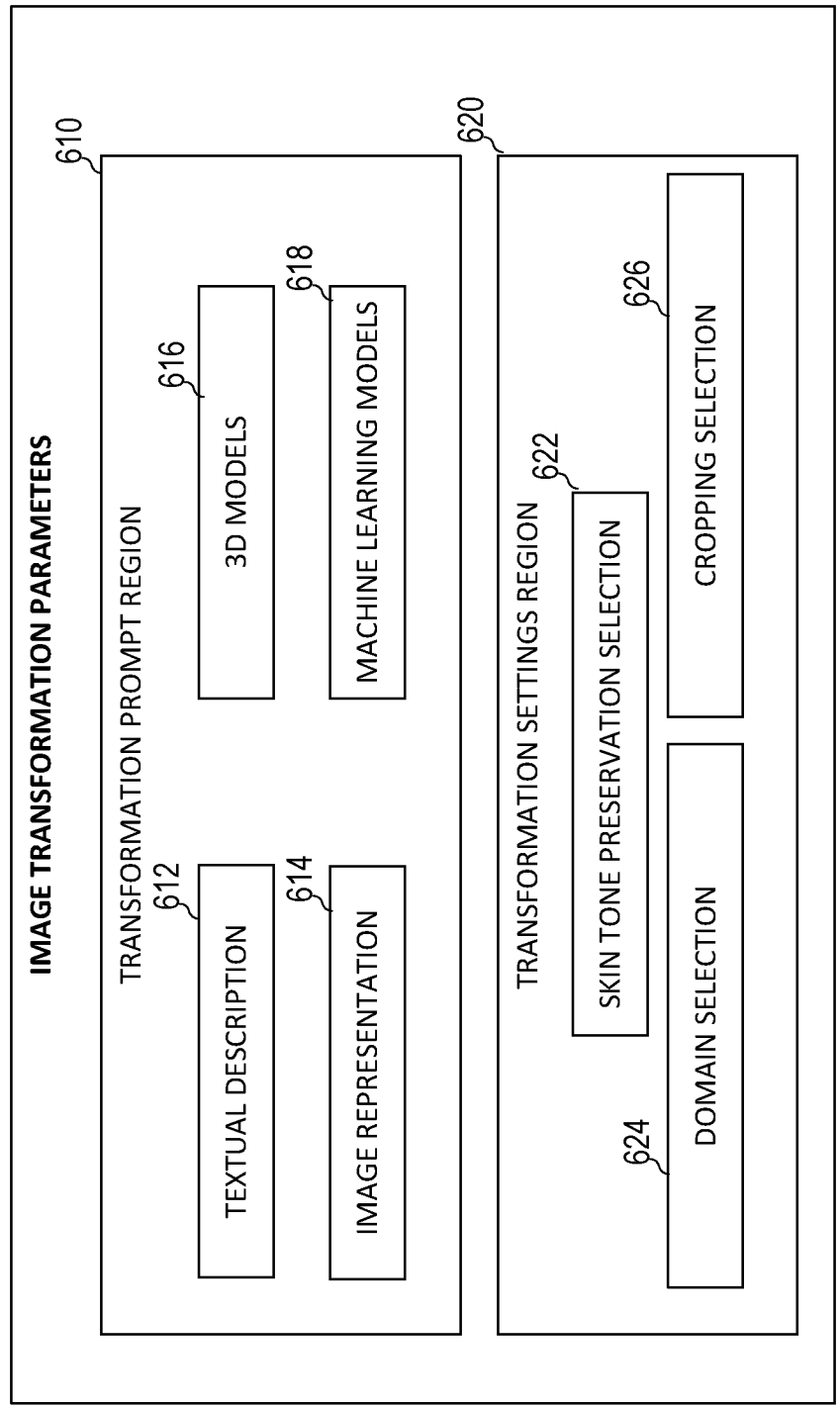
FIG. 6 is a diagrammatic representation of a GUI associated with the AR experience creation system, in accordance with some examples.

The image transformation parameters module 500 can receive input from the developer client device 102 that selects an option to automatically generate a new AR experience bundle. In response to receiving the input, the image transformation parameters module 500 can present a GUI, such as the example GUI shown in FIG. 6. The image transformation parameters module 500 can include in the GUI 600 options for defining or specifying one or more image transformation parameters.

To ensure user data privacy, the client device 102 (or application implemented on the client device 102) may notify the user regarding the type of information that may be collected and prompt the user to choose whether to opt-in prior to collecting the data. The system will not collect the data if the user declines to opt-in and does not give consent. If the user opts-in, the data is stored securely in an encrypted manner on the server.

For example, the GUI 600 includes a transformation prompt region 610 and a transformation settings region 620. The transformation prompt region 610 includes one or more options providing image transformation parameters, such as a textual description option 612, image representation option 614, 3D models option 616, and machine learning models option 618. The transformation settings region 620 includes one or more options providing image transformation parameters or settings, such as a skin tone preservation selection option 622, a domain selection option 624, a cropping selection option 626, and various other options.

In some examples, the GUI 600 receives input from the user that selects the textual description option 612. In response, the GUI 600 can present a window or region in which a user can type in natural language text. The region can include a source description region and a target description region. Alternatively, the source description and the target description can be input in the same textual region using natural language. For example, the GUI 600 can receive input from a user that describes in natural language a source image or source image portion (e.g., nose of a person) and a target image transformation (e.g., increase length and width or make look like a pig). The GUI 600 provides the textual input to the image transformation parameters module 500.

In response to receiving the text, the image transformation parameters module 500 processes the text to identify the source description and the target description. The image transformation parameters module 500 can apply one or more machine learning models to the text to identify the source and target description to derive a transformation or select a particular image transformation operation. In some examples, the image transformation parameters module 500 can store a database that associates a set of source features or attributes and set of target transformations to a corresponding transformation instruction that is used by a model to apply a particular transformation. For example, the database stores a first entry that includes a first set of source features or attributes and first set of target transformations which is associated with a first set of parameters of an image modification model. The database also stores a second entry that includes a second set of source features or attributes and second set of target transformations which is associated with a second set of parameters of the image modification model.

The image transformation parameters module 500 can extract features from the source and target transformation or deformation specified in the received text. The image transformation parameters module 500 can discover hidden relationships from the extracted features. The image transformation parameters module 500 can then search the database based on the extracted features to identify an entry that best matches the extracted features. The image transformation parameters module 500 obtains the set of parameters of the image modification model that are associated with the identified entry. The image transformation parameters module 500 then applies the set of parameters to a first image modification pipeline.

The image transformation parameters module 500 can determine if additional image transformation parameters are specified in the GUI 600. If so, the image transformation parameters module 500 obtains additional image modification parameters and generates additional image modification pipelines to process source images in parallel or sequentially with existing image modification pipelines. If no further image transformation parameters are specified in the GUI 600, the image transformation parameters module 500 receives or accesses a set of sample images and applies the image modification pipelines to the set of sample images to generate a set of target images representing the modifications. Specifically, the image transformation parameters module 500 communicates the image modification pipelines to the sample image generation module 510 to generate the target images. In some cases, the image modification parameters received via the GUI 600 are used to generate, enable, and/or update parameters of the pipelines which are implemented by the sample image generation module 510.

In some examples, the GUI 600 receives input from the user that selects the image representation option 614. This input can be used to generate a new image modification pipeline. Particularly, in response to receiving input from the user that selects the image representation option 614, the GUI 600 can present a window or region in which a user can upload one or more images that represent a desired transformation or deformation. The GUI 600 provides the one or more images to the image transformation parameters module 500.

In response to receiving the images, the image transformation parameters module 500 processes the images and can apply one or more machine learning models to the images to extract features from the images. In some examples, the image transformation parameters module 500 can store a database that associates a set of image features and set of target transformations to a corresponding transformation instruction that is used by a model to apply a particular transformation. For example, the database stores a first entry that associates a first set of image features with a first set of parameters of an image modification model. The database also stores a second entry that associates a second set of image features with a second set of parameters of the image modification model.

The image transformation parameters module 500 can extract features from the received images. The image transformation parameters module 500 can then search the database based on the extracted features to identify an entry that best matches the extracted features. The image transformation parameters module 500 obtains the set of parameters of the image modification model that are associated with the identified entry. The image transformation parameters module 500 then applies the set of parameters to a second image modification pipeline. In some examples, in addition to or alternative to searching a database, the image transformation parameters module 500 can determine the set of parameters based on a neural network latent space of the extracted features.

In some examples, the image transformation parameters module 500 can count how many images have been received or uploaded by the user in response to receiving input that selects the image representation option 614. The image transformation parameters module 500 compares the count value to a threshold. In response to determining that the count value transgresses the threshold (e.g., 25 or more images have been uploaded), the image transformation parameters module 500 can train a generative machine learning model to generate additional images that depict similar transformations as the received images. These additional images can be further processed together or separate from the user-supplied images to detect or extract features. These features can then be used to obtain parameters of the model implemented by the second image modification pipeline.

In some examples, the GUI 600 includes an option (not shown) for the user to select how to combine different image modification pipelines. The selection can specify that the first image modification pipeline output is to be combined sequentially with the second image modification pipeline. In such cases, a source image can be applied to the first image modification pipeline to generate an intermediate image. The intermediate image can then be applied to the second image modification pipeline to generate the target image corresponding to the source image.

In some examples, the selection can specify that the first and second pipelines are to be applied simultaneously or in parallel to the same source image. In such cases, the source image can be applied to the first and second pipelines to generate respective intermediate images. The intermediate images can then be processed to generate a combination (e.g., an average representation or weighted sum) of the intermediate images. The combination of the intermediate images can be provided as the target image corresponding to the source image presented to the user.

In some examples, the selection can specify that the first and second image modification pipelines are to be combined in parallel and the resulting average image is applied to third image modification pipeline to generate the target image presented to the user. Alternatively, the input can specify that the first image modification pipeline is applied first to the source image followed by parallel application of a third image modification pipeline with the second image modification pipeline. An average of the parallel application of the second and third image modification pipeline can then be presented to the user as the target image.

In some examples, the GUI 600 receives input from the user that selects the 3D models option 616. The 3D models option 616 can be used to generate the third image modification pipeline. In response to receiving input that selects the 3D models option 616, the GUI 600 presents an interface for the user to upload or select from one or more 3D models. The 3D models can be used in image processing to identify, track, and present a 3D AR object. In some cases, the 3D models can be used to identify a real-world object corresponding to the 3D models and to apply a modification or transformation based on the identified real-world object.

In some examples, the GUI 600 receives input from the user that selects the machine learning models option 618. The machine learning models option 618 can be used to generate a fourth image modification pipeline. In response to receiving input that selects the machine learning models option 618, the GUI 600 presents an interface for the user to upload or select from one or more ML models. The ML models can be used in image processing to identify, track, and present AR objects or perform certain classifications or object recognition techniques, such as indicating presence or absence of objects depicted in received images, such as real-world glasses.

In some examples, the GUI 600 receives input that selects various settings to apply. For example, the GUI 600 receives input that selects a skin tone preservation selection option 622. In such cases, the GUI 600 presents an option for the user to select whether to preserve the skin tone of the modified object and/or how much to increase or decrease color attributes of the skin tone. Based on this selection, the GUI 600 instructs the image transformation parameters module 500 to modify the color attributes, or not, of any object being modified in the target images generated based on the image transformation parameters.

The GUI 600 can receive input that selects a domain selection option 624. In response, the GUI 600 presents an interface that allows the user to specify the type of target being modified. For example, the user can select or input that the target is a human face, a particular animal, a particular body part or some other physical real-world object. Based on the selection, the image transformation parameters module 500 retrieves a corresponding previously trained object classifier and use that object classifier to improve the modification and generation of the target images from the source images.

The GUI 600 can also receive a selection of a cropping selection option 626. Based on this selection, the image transformation parameters module 500 selects one or more regions of the source image from which to crop to generate the target images.

Figure 7:
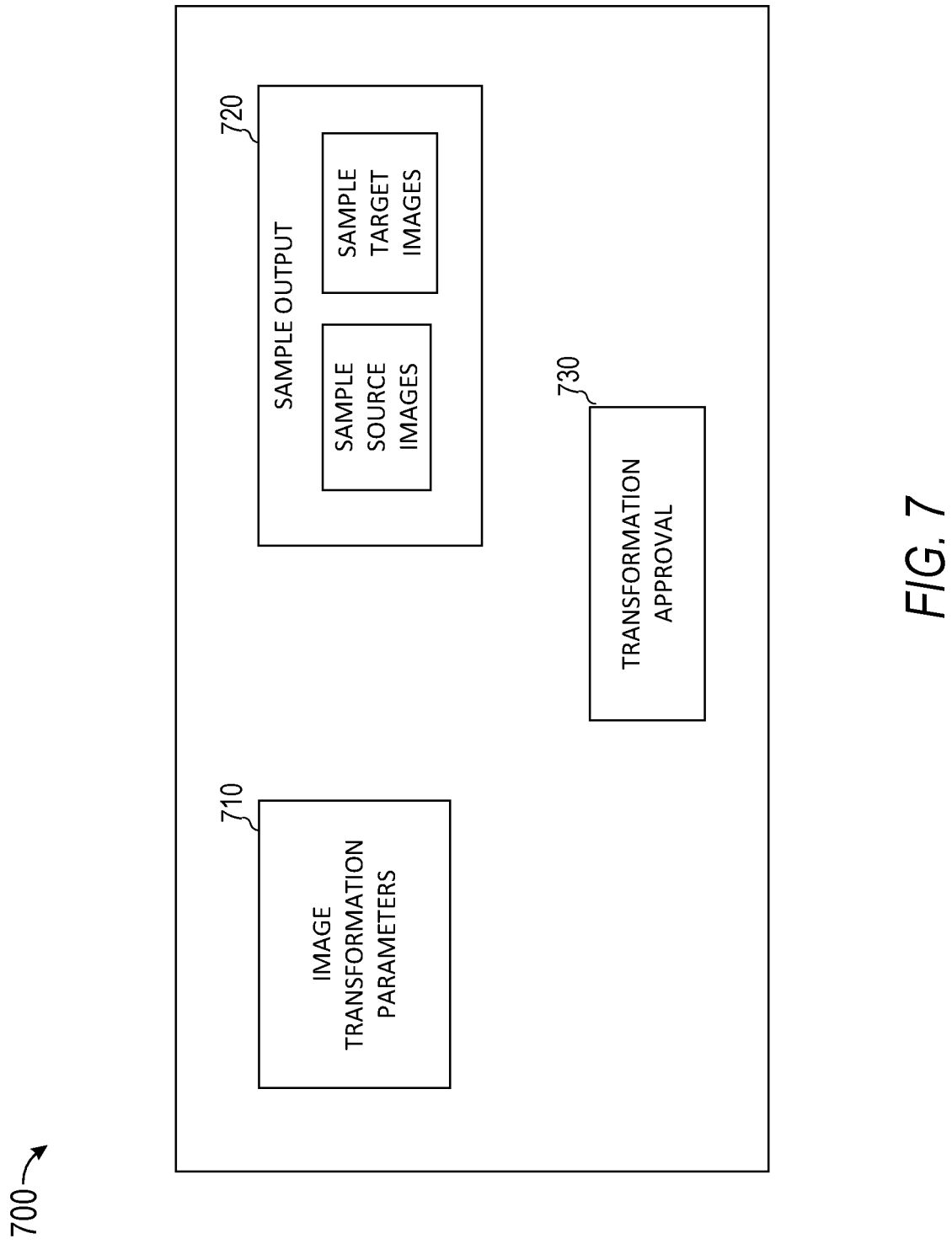
FIG. 7 is a diagrammatic representations of a part of a GUI description for a tool, in accordance with some examples.

In some examples, the GUI 600 is presented as part of a developer user interface, such as the example developer GUI 700 of FIG. 7, presented to the user. For example, the GUI 600 can be included as an image transformation parameters portion 710 of the developer GUI 700. After receiving input that confirms completion of inputting the image transformation parameters in the GUI 600, the image transformation parameters module 500 can communicate with the sample image generation module 510 to generate a sample set of target images.

The sample image generation module 510 searches or accesses a set of sample source images, such as from a library of images or the Internet. The images can be randomly selected. In some examples, the sample image generation module 510 implements a generative neural network that generates a sample of images. The sample of images can be modified by adjusting parameters of the generative neural network.

The sample image generation module 510 applies one or more image modification pipelines together with any of the settings (e.g., the cropping selections, skin tone preservation selections, and/or domain selections) to the sample source images to generate a corresponding set of sample target images. The sample target images represent the modifications or transformations applied to the sample source images based on the inputs received via the GUI 600. The sample image generation module 510 presents a sample output region 720. The sample output region 720 includes one or more of the set of sample source images and their respective sample target images that were generated.

The GUI 700 includes a transformation approval option 730. In response to receiving input that specifies that the transformations presented in the sample output region 720 are not approved via the transformation approval option 730, the user interface 700 enables the user to input updates or modifications to one or more of the image transformation parameters presented in the image transformation parameters portion 710. In response to receiving the updates or modifications, the sample image generation module 510 updates the image modification pipelines and applies the new transformations to the same set of sample source images and/or to a new set of sample source images to generate new sample target images. The sample image generation module 510 can present the new sample target images and their corresponding sample source images in the sample output region 720.

In some cases, the sample output region 720 presents sample target images from prior iterations corresponding to prior received image transformation parameters. Namely, the sample output region 720 can present a first column that includes original sample source images, a second column that represents a first set of sample target images to which a first image transformation has been applied, and a third column that represents a second set of sample target images to which a second image transformation has been applied. This allows the user to easily see any differences resulting from the updated or modified image transformation parameters. In some cases, a user may be interested in image modifications applied in a prior iteration, such as those represented by the first set of sample target images in the second column. Input can be received from the user that selects a particular target image from the first set of target images. In response, the sample output region 720 instructs the image transformation parameters module 500 to obtain the parameters used to generate the target image of the prior iteration. The parameters are then updated in the image transformation parameters portion 710.

In some examples, in response to receiving input that specifies that the transformations presented in the sample output region 720 are approved via the transformation approval option 730, the AR experience generation module 520 is instructed to generate automatically an AR experience bundle. The AR experience generation module 520 obtains a collection of training data that includes multiple source images and corresponding target images to which the modifications or transformations of the pipelines corresponding to the image transformation parameters portion 710 are applied. Namely, the image transformation parameters portion 710 is used to modify the multiple source images to generate corresponding target images that are used as the ground truth image representations. The AR experience generation module 520 obtains a machine learning model and trains the machine learning model to generate target images from source images, such as by establishing a relationship between the training source images and the training target images.

In some examples, the machine learning model is applied to a first of the training source images. The machine learning model estimates a first target image corresponding to the first of the training source images. The machine learning model obtains the ground truth target image corresponding to the first of the training source images. A deviation can be computed between the ground truth target image and the estimated first target image. Parameters of the machine learning model are then updated based on the deviation. A stopping criterion is analyzed to determine if training is complete, such as if a sufficient quantity of training data has been processed or if the deviation is within a specified threshold. If the stopping criterion is not satisfied, the machine learning model is applied to a second of the training source images. The machine learning model estimates a second target image corresponding to the second of the training source images. The machine learning model obtains a second ground truth target image corresponding to the second of the training source images. A deviation can be computed between the second ground truth target image and the estimated second target image. Parameters of the machine learning model are then updated based on the deviation. A stopping criterion is again analyzed to determine if training is complete, such as if a sufficient quantity of training data has been processed or if the deviation is within a specified threshold.

After training the machine learning model, the machine learning model is stored as part of the AR experience bundle to automatically create the AR experience bundle. The AR experience bundle is then provided to the AR experience developer to allow the developer to share the AR experience bundle with one or more other users.

Figure 8:
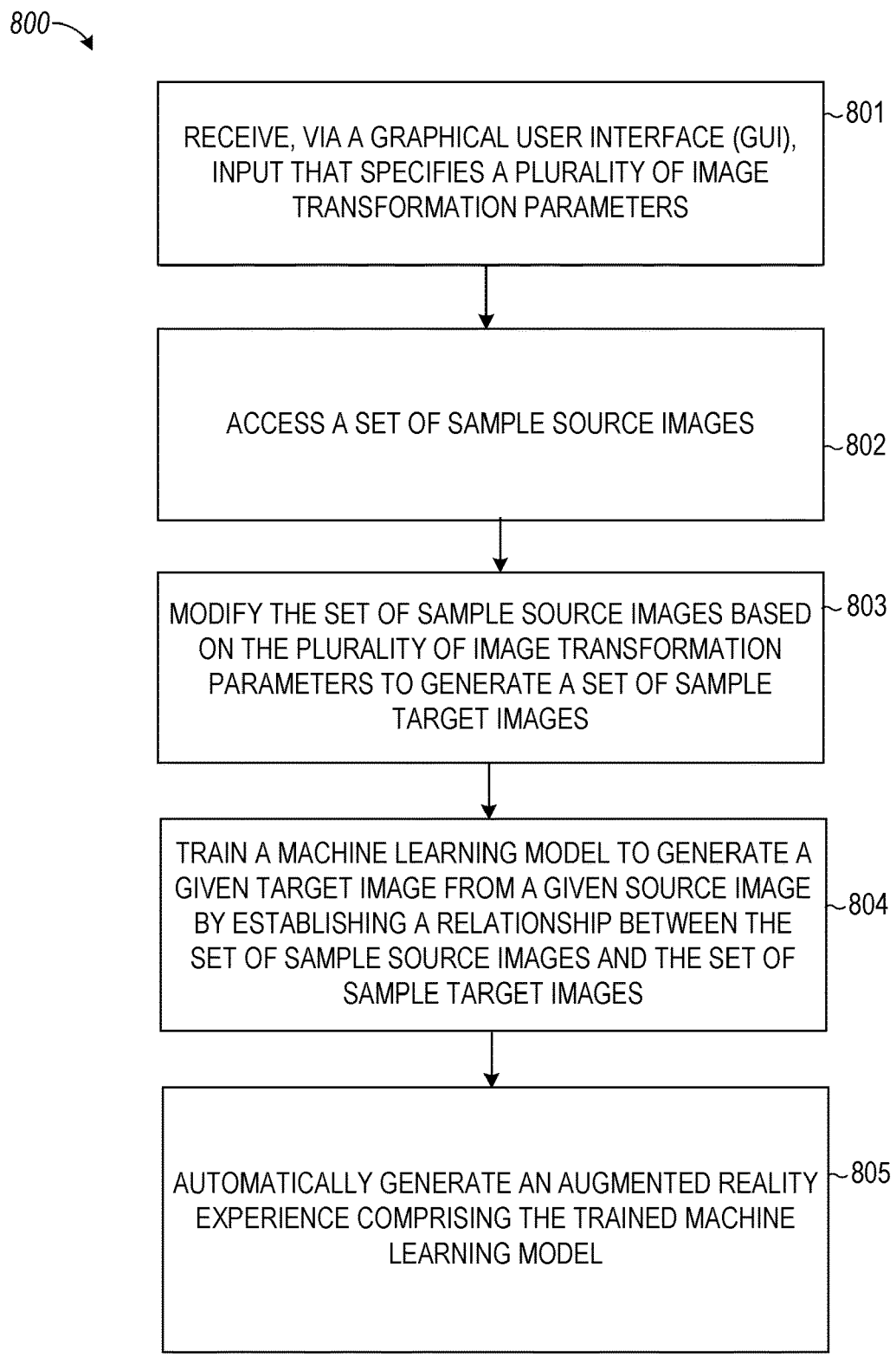
FIG. 8 is a flowchart illustrating example operations of the AR experience creation system, according to some examples.

FIG. 8 is a flowchart of a process 800 performed by the AR experience creation system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 801, the AR experience creation system 224 (e.g., a client device 102 or a server) receives, via a graphical user interface (GUI), input that specifies a plurality of image transformation parameters, as discussed above.

At operation 802, the AR experience creation system 224 accesses a set of sample source images, as discussed above.

At operation 803, the AR experience creation system 224 modifies the set of sample source images based on the plurality of image transformation parameters to generate a set of sample target images, as discussed above.

At operation 804, the AR experience creation system 224 trains a machine learning model to generate a given target image from a given source image by establishing a relationship between the set of sample source images and the set of sample target images, as discussed above.

At operation 805, the AR experience creation system 224 automatically generates an augmented reality experience comprising the trained machine learning model, as discussed above.

Machine Architecture

Figure 9:
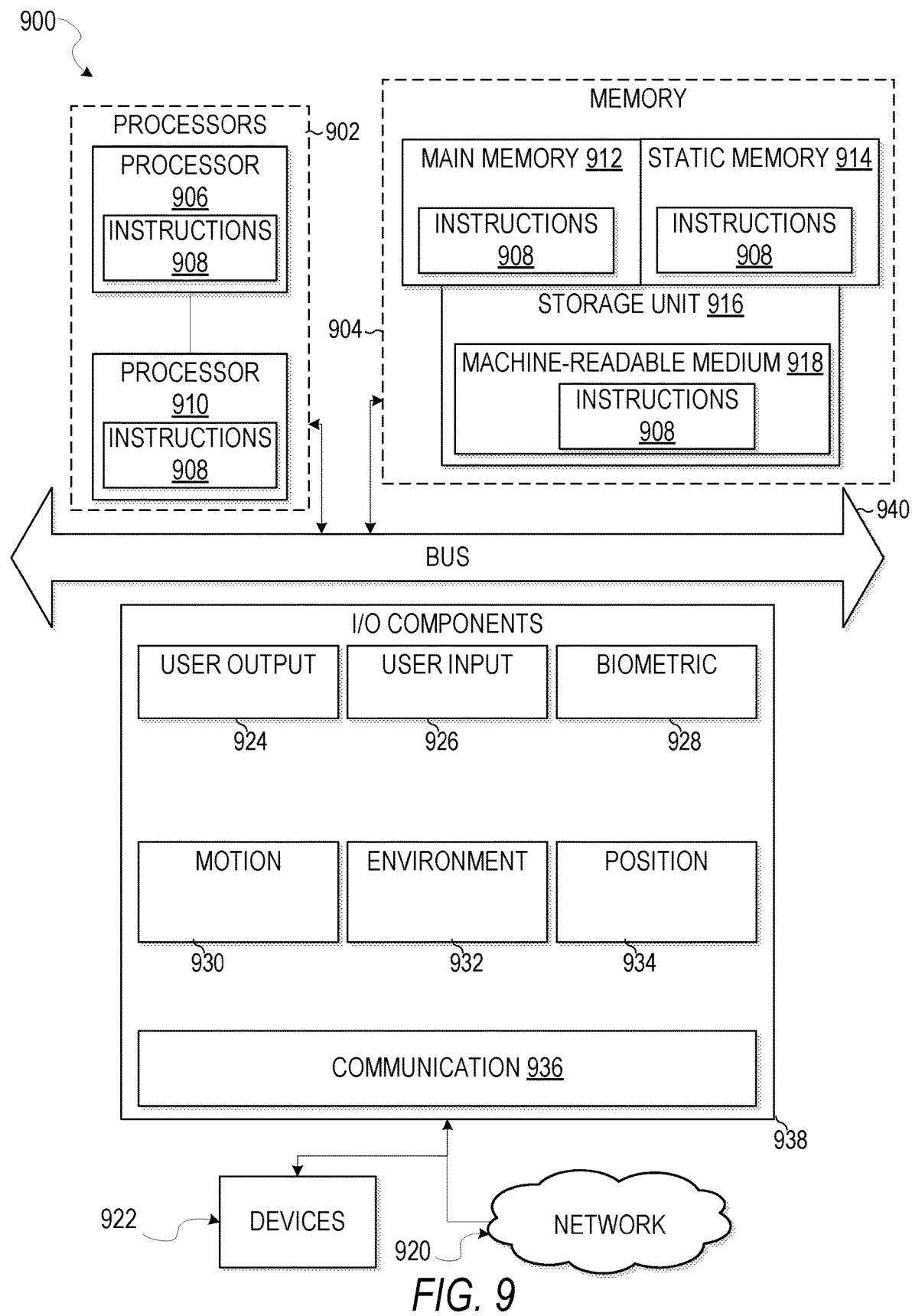
FIG. 9 is a diagrammatic representation of a machine in the form of a computer system within which a set of instructions may be executed for causing the machine to perform any one or more of the methodologies discussed herein, in accordance with some examples.

FIG. 9 is a diagrammatic representation of a machine 900 within which instructions 908 (e.g., software, a program, an application, an applet, an app, or other executable code) for causing the machine 900 to perform any one or more of the methodologies discussed herein may be executed. For example, the instructions 908 may cause the machine 900 to execute any one or more of the methods described herein. The instructions 908 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 908, sequentially or otherwise, that specify actions to be taken by the machine 900. Further, while only a single machine 900 is illustrated, the term "machine" shall also be taken to include a collection of machines that individually or jointly execute the instructions 908 to perform any one or more of the methodologies discussed herein. The machine 900, for example, may comprise the client device 102 or any one of a number of server devices forming part of the messaging server system 108. In some examples, the machine 900 may also comprise both client and server systems, with certain operations of a particular method or algorithm being performed on the server-side and with certain operations of the particular method or algorithm being performed on the client-side.

The machine 900 may include processors 902, memory 904, and input/output (I/O) components 938, which may be configured to communicate with each other via a bus 940. In an example, the processors 902 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 906 and a processor 910 that execute the instructions 908. The term "processor" is intended to include multi-core processors that may comprise two or more independent processors (sometimes referred to as "cores") that may execute instructions contemporaneously. Although FIG. 9 shows multiple processors 902, the machine 900 may include a single processor with a single-core, a single processor with multiple cores (e.g., a multi-core processor), multiple processors with a single core, multiple processors with multiples cores, or any combination thereof.

The memory 904 includes a main memory 912, a static memory 914, and a storage unit 916, all accessible to the processors 902 via the bus 940. The main memory 912, the static memory 914, and the storage unit 916 store the instructions 908 embodying any one or more of the methodologies or functions described herein. The instructions 908 may also reside, completely or partially, within the main memory 912, within the static memory 914, within a machine-readable medium within the storage unit 916, within at least one of the processors 902 (e.g., within the processor's cache memory), or any suitable combination thereof, during execution thereof by the machine 900.

The I/O components 938 may include a wide variety of components to receive input, provide output, produce output, transmit information, exchange information, capture measurements, and so on. The specific I/O components 938 that are included in a particular machine will depend on the type of machine. For example, portable machines such as mobile phones may include a touch input device or other such input mechanisms, while a headless server machine will likely not include such a touch input device. It will be appreciated that the I/O components 938 may include many other components that are not shown in FIG. 9. In various examples, the I/O components 938 may include user output components 924 and user input components 926. The user output components 924 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 926 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 938 may include biometric components 928, motion components 930, environmental components 932, or position components 934, among a wide array of other components. For example, the biometric components 928 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 930 include acceleration sensor components (e.g., accelerometer), gravitation sensor components, rotation sensor components (e.g., gyroscope).

The environmental components 932 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 934 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 938 further include communication components 936 operable to couple the machine 900 to a network 920 or devices 922 via respective coupling or connections. For example, the communication components 936 may include a network interface component or another suitable device to interface with the network 920. In further examples, the communication components 936 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 922 may be another machine or any of a wide variety of peripheral devices (e.g., a peripheral device coupled via a USB).

Moreover, the communication components 936 may detect identifiers or include components operable to detect identifiers. For example, the communication components 936 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 936, such as location via Internet Protocol (IP) geolocation, location via Wi-Fi® signal triangulation, location via detecting an NFC beacon signal that may indicate a particular location, and so forth.

The various memories (e.g., main memory 912, static memory 914, and memory of the processors 902) and storage unit 916 may store one or more sets of instructions and data structures (e.g., software) embodying or used by any one or more of the methodologies or functions described herein. These instructions (e.g., the instructions 908), when executed by processors 902, cause various operations to implement the disclosed examples.

The instructions 908 may be transmitted or received over the network 920, using a transmission medium, via a network interface device (e.g., a network interface component included in the communication components 936) and using any one of several well-known transfer protocols (e.g., hypertext transfer protocol (HTTP)). Similarly, the instructions 908 may be transmitted or received using a transmission medium via a coupling (e.g., a peer-to-peer coupling) to the devices 922.

Software Architecture

Figure 10:
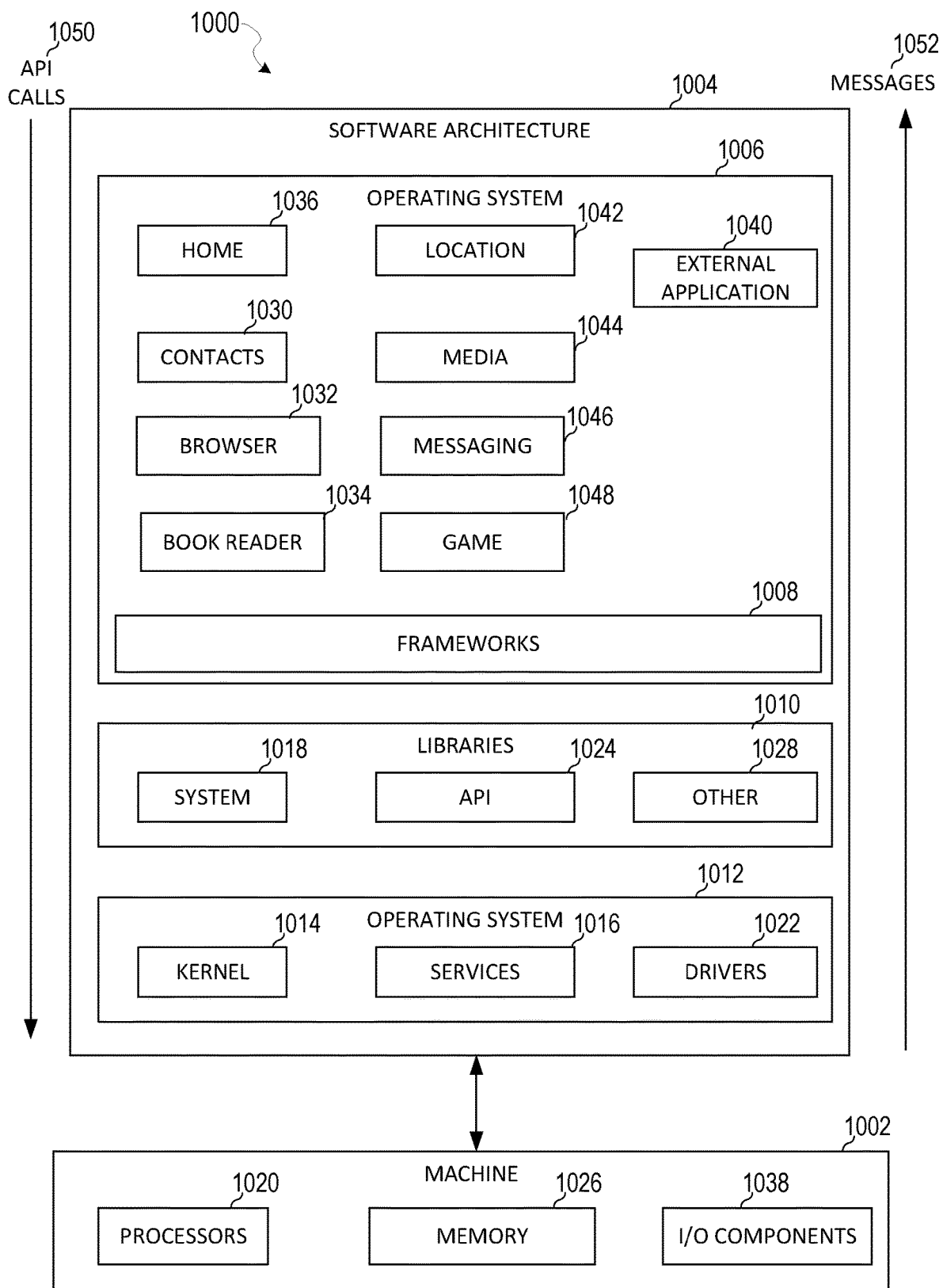
FIG. 10 is a block diagram showing a software architecture within which examples may be implemented.

FIG. 10 is a block diagram 1000 illustrating a software architecture 1004, which can be installed on any one or more of the devices described herein. The software architecture 1004 is supported by hardware such as a machine 1002 that includes processors 1020, memory 1026, and I/O components 1038. In this example, the software architecture 1004 can be conceptualized as a stack of layers, where each layer provides a particular functionality. The software architecture 1004 includes layers such as an operating system 1012, libraries 1010, frameworks 1008, and applications 1006.

Operationally, the applications 1006 invoke API calls 1050 through the software stack and receive messages 1052 in response to the API calls 1050.

The operating system 1012 manages hardware resources and provides common services. The operating system 1012 includes, for example, a kernel 1014, services 1016, and drivers 1022. The kernel 1014 acts as an abstraction layer between the hardware and the other software layers. For example, the kernel 1014 provides memory management, processor management (e.g., scheduling), component management, networking, and security settings, among other functionality. The services 1016 can provide other common services for the other software layers. The drivers 1022 are responsible for controlling or interfacing with the underlying hardware. For instance, the drivers 1022 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1010 provide a common low-level infrastructure used by applications 1006. The libraries 1010 can include system libraries 1018 (e.g., C standard library) that provide functions such as memory allocation functions, string manipulation functions, mathematic functions, and the like. In addition, the libraries 1010 can include API libraries 1024 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1010 can also include a wide variety of other libraries 1028 to provide many other APIs to the applications 1006.

The frameworks 1008 provide a common high-level infrastructure that is used by the applications 1006. For example, the frameworks 1008 provide various graphical user interface (GUI) functions, high-level resource management, and high-level location services. The frameworks 1008 can provide a broad spectrum of other APIs that can be used by the applications 1006, some of which may be specific to a particular operating system or platform.

In an example, the applications 1006 may include a home application 1036, a contacts application 1030, a browser application 1032, a book reader application 1034, a location application 1042, a media application 1044, a messaging application 1046, a game application 1048, and a broad assortment of other applications such as an external application 1040. The applications 1006 are programs that execute functions defined in the programs. Various programming languages can be employed to create one or more of the applications 1006, structured in a variety of manners, such as object-oriented programming languages (e.g., Objective-C, Java, or C++) or procedural programming languages (e.g., C or assembly language). In a specific example, the external application 1040 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1040 can invoke the API calls 1050 provided by the operating system 1012 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 902 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, via a graphical user interface (GUI), input that specifies a plurality of image transformation parameters;
accessing a set of sample source images;
generating, based on the set of sample source images, a first collection of images using a first image modification pipeline, the first image modification pipeline corresponding to a first portion of the plurality of image transformation parameters;
generating, based on the set of sample source images, a second collection of images using a second image modification pipeline, the second image modification pipeline corresponding to a second portion of the plurality of image transformation parameters;
estimating an average representation of the first and second collections of images to generate a set of sample target images; and
training a machine learning model to generate a given target image from a given source image by establishing a relationship between the set of sample source images and the set of sample target images.

2. The method of claim 1, further comprising:
displaying, via the GUI, the set of sample source images and the set of sample target images.

3. The method of claim 2, further comprising:
receiving input, via the GUI, that indicates that the set of sample target images is unacceptable.

4. The method of claim 3, further comprising:
after receiving the input that indicates that the set of sample target images is unacceptable, updating the set of image transformation parameters;
generating an updated set of sample target images based on the updated set of image transformation parameters; and
updating the display to present the updated set of sample target images.

5. The method of claim 4, further comprising:
receiving input, via the GUI, that indicates that the updated set of sample target images is acceptable, wherein the machine learning model is trained in response to receiving the input that indicates that the update set of sample target images is acceptable.

6. The method of claim 1, wherein the plurality of image transformation parameters includes at least two of:
textual transformation description, image representations of transformations, one or more three-dimensional (3D) models, one or more machine learning models, a domain, skin tone preservation data, or cropping information.

7. The method of claim 6, wherein the domain describes an object type that is a target of the image transformation parameters.

8. The method of claim 6, wherein the cropping information indicates whether to apply a wide crop or a narrow crop, further comprising:
displaying a plurality of cropping options on the GUI, each of the plurality of cropping options corresponding to a different trained cropping network; and
receiving input, via the GUI, that selects a given cropping option from the plurality of cropping options.

9. The method of claim 1, further comprising:
receiving, as one of the plurality of image transformation parameters, textual transformation description that describes a source representation and that describes a target representation;
processing the textual transformation description by a first model to generate a first translation of the source representation to the target representation;
using the first model to obtain hidden representations of images associated with the first translation and generate a first set of image transformations; and
applying the first set of image transformations to the set of sample source images via the first image modification pipeline to generate a portion of the set of sample target images.

10. The method of claim 9, wherein the textual transformation description indicates one or more of motion or object style.

11. The method of claim 9, further comprising:
receiving, as a second one of the plurality of image transformation parameters, one or more image representations of transformations that visually represent the target representation;
processing the one or more image representations by a second model to generate a second translation of the target representation; and
applying the second translation of the target representation to the set of sample source images via the second image modification pipeline to generate another portion of the set of sample target images.

12. The method of claim 11, further comprising:
generating, based on the set of sample source images, a first collection of images using the first image modification pipeline; and
generating, based on the first collection of images, the second collection of images using the second image modification pipeline, wherein the set of sample target images is generated based on the second collection of images.

13. The method of claim 11, further comprising:
determining that the one or more image representations includes a threshold quantity of images; and
training a generative network based on the one or more image representations to generate additional image representations, the generative network being used to generate the set of sample target images.

14. The method of claim 9, further comprising:
receiving, as a second one of the plurality of image transformation parameters, one or more machine learning models comprising a classifier or a translation model; and
processing the set of sample source images by the one or more machine learning models independently of the first image modification pipeline to generate the set of sample target images.

15. The method of claim 9, further comprising:
receiving, as a second one of the plurality of image transformation parameters, one or more three-dimensional (3D) models; and
processing the set of sample source images using the one or more 3D models prior to providing features used to generate the set of sample target images.

16. The method of claim 1, further comprising:
accessing one or more machine learning models comprising a classifier or a translation model; and
processing the set of sample source images by the one or more machine learning models independently of the first image modification pipeline to generate the set of sample target images.

17. A system comprising:
at least one processor; and
a memory component having instructions stored thereon that, when executed by the at least one processor, cause the at least one processor to perform operations comprising:
receiving, via a graphical user interface (GUI), input that specifies a plurality of image transformation parameters;
accessing a set of sample source images;
generating, based on the set of sample source images, a first collection of images using a first image modification pipeline, the first image modification pipeline corresponding to a first portion of the plurality of image transformation parameters;
generating, based on the set of sample source images, a second collection of images using a second image modification pipeline, the second image modification pipeline corresponding to a second portion of the plurality of image transformation parameters;
estimating an average representation of the first and second collections of images to generate a set of sample target images; and
training a machine learning model to generate a given target image from a given source image by establishing a relationship between the set of sample source images and the set of sample target images.

18. The system of claim 17, the operations further comprising:
displaying, via the GUI, the set of sample source images and the set of sample target images.

19. The system of claim 18, the operations further comprising:
receiving input, via the GUI, that indicates that the set of sample target images is unacceptable.

20. A non-transitory computer-readable storage medium having stored thereon instructions that, when executed by at least one processor, cause the at least one processor to perform operations comprising:
receiving, via a graphical user interface (GUI), input that specifies a plurality of image transformation parameters;
accessing a set of sample source images;
generating, based on the set of sample source images, a first collection of images using a first image modification pipeline, the first image modification pipeline corresponding to a first portion of the plurality of image transformation parameters;
generating, based on the set of sample source images, a second collection of images using a second image modification pipeline, the second image modification pipeline corresponding to a second portion of the plurality of image transformation parameters;
estimating an average representation of the first and second collections of images to generate a set of sample target images; and
training a machine learning model to generate a given target image from a given source image by establishing a relationship between the set of sample source images and the set of sample target images.

* * * * *